No. 850,567. PATENTED APR. 16, 1907.
J. A. CROSBY & J. J. PINK.
MACHINE FOR TAKING AND EXHIBITING PICTURES.
APPLICATION FILED FEB. 15, 1906.

No. 850,567. PATENTED APR. 16, 1907.
J. A. CROSBY & J. J. PINK.
MACHINE FOR TAKING AND EXHIBITING PICTURES.
APPLICATION FILED FEB. 15, 1906.

Witnesses:
Thos. E. Billings
R. R. Billings

Inventors:
James A. Crosby
John J. Pink
by Chas. E. Shurwey
atty.

No. 850,567. PATENTED APR. 16, 1907.
J. A. CROSBY & J. J. PINK.
MACHINE FOR TAKING AND EXHIBITING PICTURES.
APPLICATION FILED FEB. 15, 1906.

UNITED STATES PATENT OFFICE.

JAMES A. CROSBY AND JOHN J. PINK, OF CHICAGO, ILLINOIS, ASSIGNORS TO SIDNEY H. SELIG, TRUSTEE, OF CHICAGO, ILLINOIS.

MACHINE FOR TAKING AND EXHIBITING PICTURES.

No. 850,567.    Specification of Letters Patent.    Patented April 16, 1907.

Application filed February 15, 1906. Serial No. 301,135.

*To all whom it may concern:*

Be it known that we, JAMES A. CROSBY, a subject of the Dominion of Canada, and JOHN J. PINK, a citizen of the United States of America, both residing at Chicago, in the county of Cook and State of Illinois, have invented certain new and useful Improvements in Machines for Taking and Exhibiting Pictures, of which the following is a specification.

Our invention relates to certain new and useful improvements in machines for taking and exhibiting pictures; and its object is to produce a machine which shall avoid certain of the undesirable features now contained in machines of this general class. In these machines a series of pictures of animated objects are taken upon a sensitized film, the pictures following each other in rapid succession. These pictures are then developed and reproduced upon a positive strip, known as the "ribbon," which can be run through the machine and the pictures projected upon a screen by means of a suitable light, the effect being that a series of pictures are produced upon the screen in which the movement of the animated objects are visible. When the pictures are to be taken upon the film, the machine is entirely inclosed in a suitable box, leaving nothing but the lens exposed. We have devised a machine of this class in which the mechanism controlling the film and the light has been greatly improved, and to such end our invention relates to certain novel features of construction, a description of which will be found in the following specification and the essential features pointed out in the claims.

The invention is illustrated in the drawings furnished herewith by twenty figures, of which—

Figures 1, 2, 3:
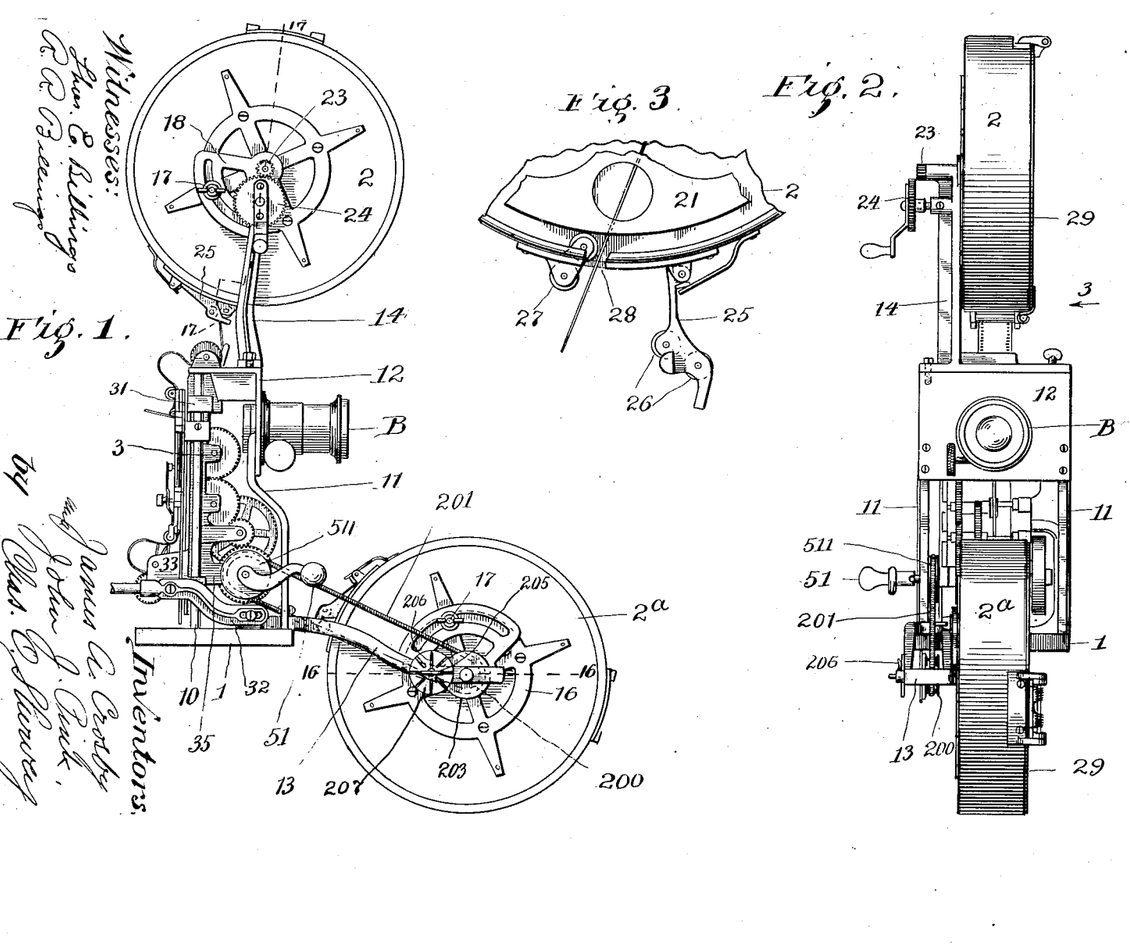
Figure 1 is a side view of the machine.
Fig. 2 is a front view.
Fig. 3 is a fragmental side view of one of the magazines, illustrating certain ribbon-guiding mechanism, the view being taken in the direction of the arrow 3 in Fig. 2.
Figure 4:
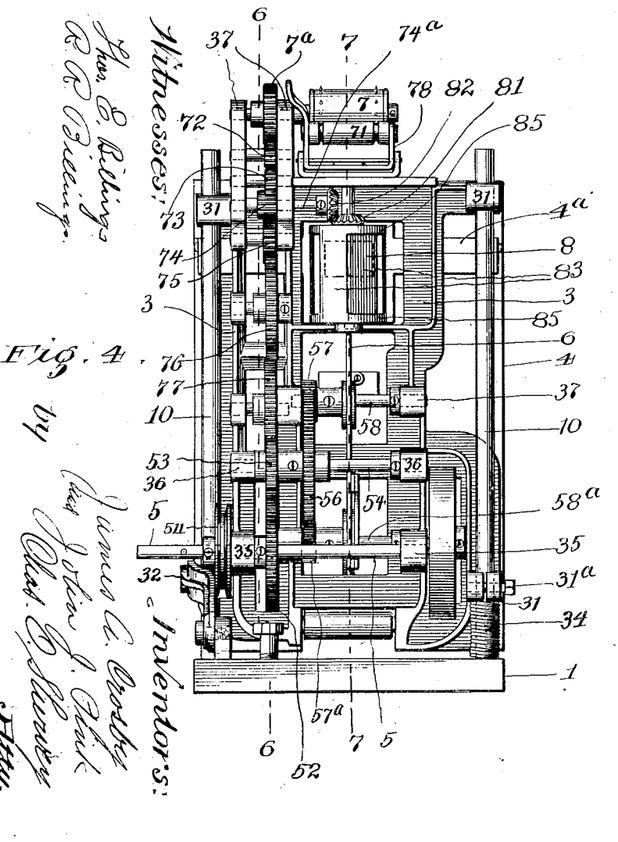
Fig. 4 is a front view of a portion of the mechanism, both magazines, their supports, and certain parts of the frame being removed to illustrate portions which would otherwise be hidden from view.
Figure 5:
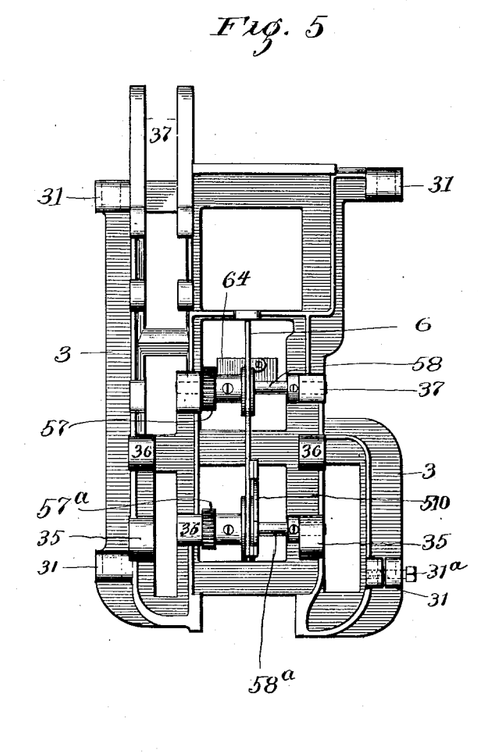
Fig. 5 is a front view of the sliding frame, the film-advancing plate, and certain adjacent operating mechanism.
Figure 6:
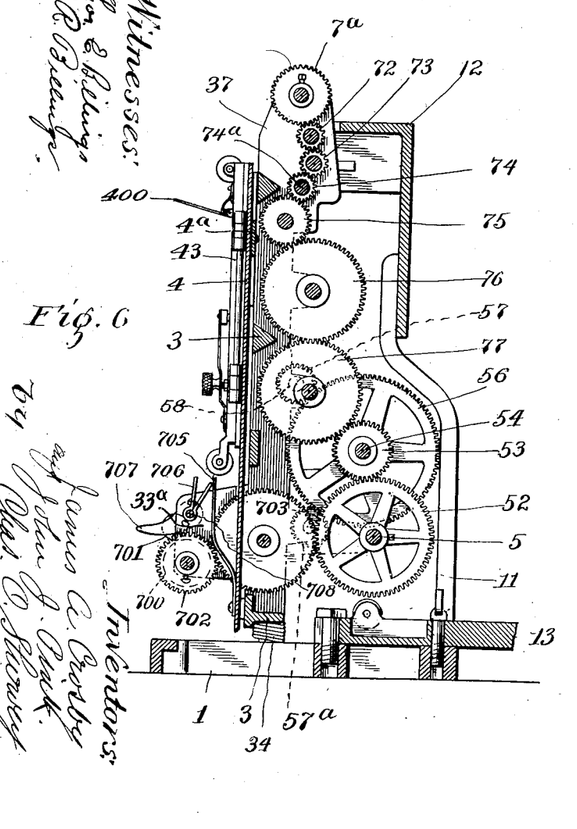
Fig. 6 is a side view of the main gearing, the frame being cut away in the line 6 6 in Fig. 4.

Referring to said drawings; 1 is the base, preferably rectangular in form and bearing four posts 10 10 and 11 11, which support at their upper ends a bracket 12. Upon the base and bracket are removably supported two arms 13 14, which support the magazines 2 and 2ª. These magazines are practically alike and will be described more fully later on in the course of this specification. Upon the posts 10 is slidably mounted a frame 3, which carries the ribbon guiding and advancing mechanism, the shutter, and shutter-operating mechanism. This frame is formed with perforated lugs 31, which encircle the posts 10 and connect the frame 3 thereto. A lever 32, fulcrumed to the base and pivoted to a lug 33 on the frame 3, is employed to shift the position of the sliding frame upon the posts, and a spring 34, interposed between the base and one of the lugs 31, serves to ease the raising of the frame. If desired, any or all of the lugs may be provided with some tension device for producing friction upon the posts. This is clearly shown at 31ª in Fig. 4.

The ribbon, which is wound upon a spool in the magazine 2, is led through certain guiding devices, hereafter explained, to a spool in the magazine 2ª to be wound upon said second spool after passing through the machine. In its progress through the machine the pictures on the ribbon are successively brought to rest immediately back of an opening 41 in a plate 4, which is secured to the frame 3. It is allowed to remain in such position of rest for a period of time, during which time the picture is exposed. The ribbon is then advanced to bring the succeeding pictures to the position previously occupied by the picture just in advance of it. During this interval the light passing through the lens is shut off, and the advancement of the pictures is not visible upon the screen. Likewise the film is not exposed during the shifting of the film when the machine is used in taking the pictures.

Figures 11, 12, 13, 14:
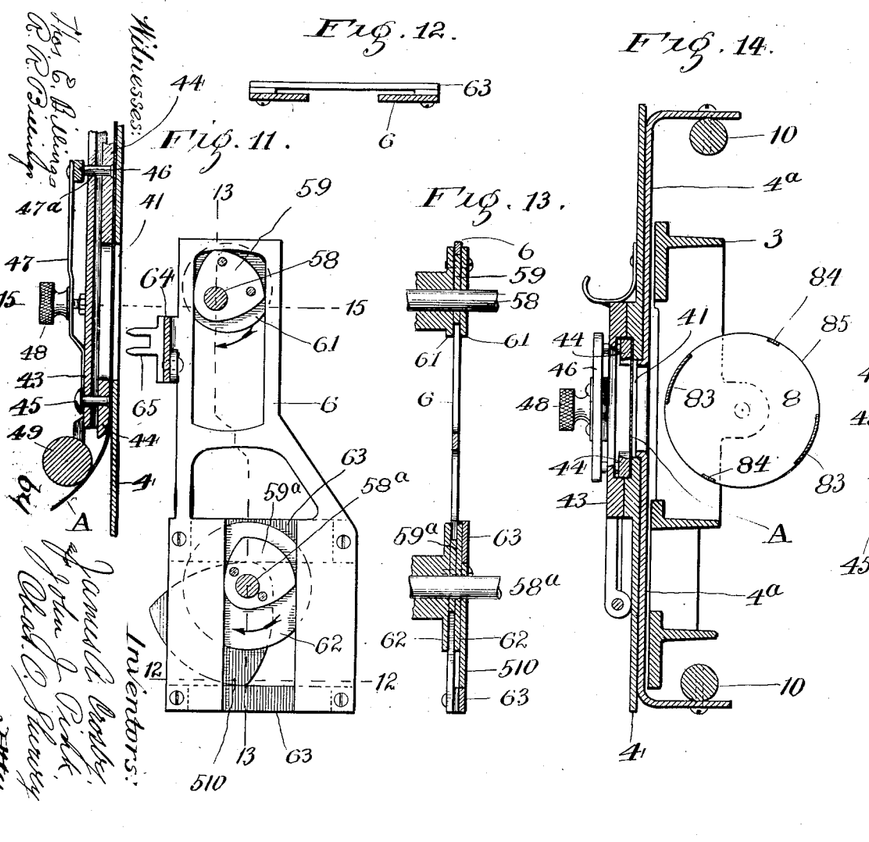
Fig. 11 is a fragmental view of certain ribbon-guiding and advancing mechanism, partly in side elevation and partly in vertical section, the line of section being shown at 11 11 in Fig. 15.
Fig. 12 is a horizontal section in the line 12 12 in Fig. 11.
Fig. 13 is a vertical cross-section in the line 13 13 in Fig. 11.
Fig. 14 is a horizontal section in the line 14 14 of Fig. 7.

The mechanism for intermittently advancing the ribbon will now be described. The crank-shaft of the mechanism is seen at 5, Figs. 4 to 7, and is rotated by a crank 51. The shaft 5 is journaled in forwardly-extending lugs 35 on the frame 3 and carries a gear-wheel 52, which meshes with a pinion 53, fast upon a shaft 54, which is journaled in lugs 36 upon the frame. The shaft 54 bears a gear 56, which meshes with two pinions 57 and 57ª upon shafts 58 and 58ª. The shafts 58 and 58ª are journaled upon the frame 3 and bear cams 59 59ª, (see Fig. 11,) which actuate a ribbon-advancing plate 6 to move it to and from the ribbon. The shaft 58ª also bears a cam 510, which reciprocates the plate in a vertical direction. The intermittent advancement of the ribbon is effected by the plate 6 and the cams which actuate it. The plate 6 is best seen in Figs. 11 to 13 and has four vertical working faces against which the cams 59 and 59ª bear in shifting the plate laterally—that is, from front to back. It also has two horizontal working faces for the cam 510, and said cam engages these faces in moving the plate up and down. The plate, it will be noticed, slides between two disks 61 62, secured upon the two sides of the cams 59 and 59ª, and is guided laterally thereby. Vertical movement and movement to and from the ribbon is entirely controlled by the cams 59, 59ª, and 510. The working faces of the plate, which are engaged by the cam 510, are upon horizontal bars 63, which are separated from the plate by small blocks, as clearly shown in Fig. 12. Upon the front edge of the plate 6 is a plate 64, which bears four pins 65, which engage with the perforation in the ribbon A.

Figure 7:
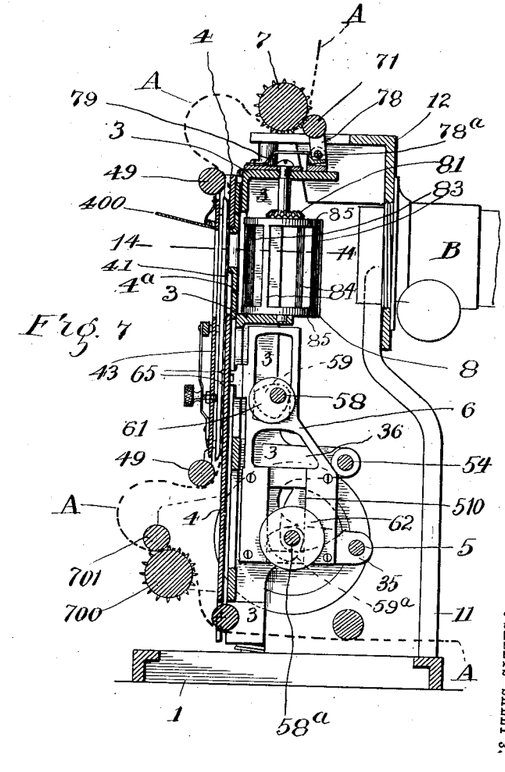
Fig. 7 is a similar view of the ribbon-advancing mechanism and shutter, the section through the frame being taken at 7 7 in Fig. 4.

The cams 59, 59ª, and 510 are so constructed and timed that in a cycle of operation a quarter-revolution draws the plate down, advancing the ribbon, and the remaining three-quarters of the revolution retracts the plate from the ribbon, returns it to its uppermost position, and shifts it back to the ribbon, this being the position from which it started. In a cycle of operation the ribbon is thus exposed during three-fourths of the period and shifted during the remaining one-fourth of the period. Pictures which are exposed to view for a less period than this are not so clear and distinct, and when less time is used in a cycle of operation to shift the picture there is much danger of the ribbon being torn by the advancing mechanism. In Fig. 7 the plate 6 is shown at its uppermost position with the pins in engagement with the perforations in the ribbon. A quarter-revolution of the shafts 58 58ª will draw the plate down in a straight line, consequently advancing the film. Another quarter-revolution will bring the plate into the position shown in Fig. 11. During the completion of the revolution the plate will be raised to its uppermost position and then shifted back, bringing the pins into engagement with the perforations in the ribbon. It should be noticed that the cams are so shaped that when the plate is moving up or down no lateral movement takes place and that when moved laterally no vertical movement is effected. The plate thus follows a perfectly rectangular course in its movement, drawing the ribbon down in a perfectly straight line.

The ribbon as it comes from the magazine 2 passes between a sprocket 7 (see Fig. 7) and a roller 71. The sprocket is mounted upon a spindle journaled in brackets 37 of the frame 3, and said spindle bears a gear-wheel 7ª, connected by a train of gears 72 73 74 75 76 77 with the gear 53, heretofore referred to. The sprocket 7 is geared to rotate at a speed which will feed the ribbon to the advancing mechanism as fast as said mechanism advances it along. The roller 71 is mounted upon a frame 78, spring-pressed toward the sprocket and capable of being separated therefrom when the ribbon is threaded through the machine. A spring 79 engages a lug 78ª on one side of the center of the pivot of said frame and holds the roller in contact with the ribbon or sprocket. When the roller is swung a certain distance away from the sprocket, the spring acts to hold it back after the manner of the ordinary holdback-hinge.

Figure 9:
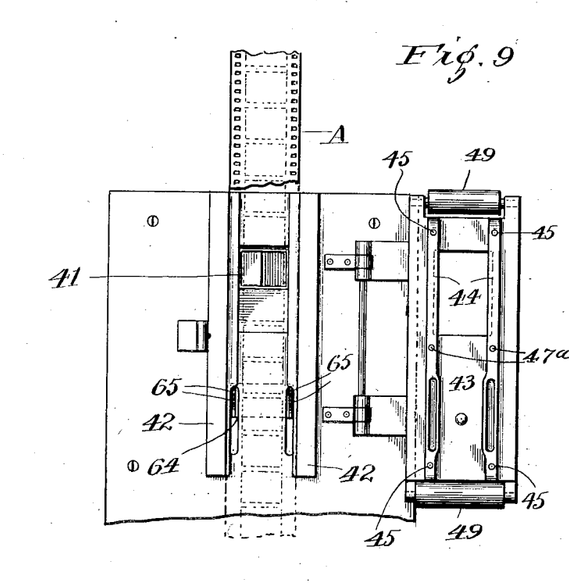
Fig. 9 is a rear fragmental view showing a certain ribbon-guiding gate in an open position.
Figure 15:
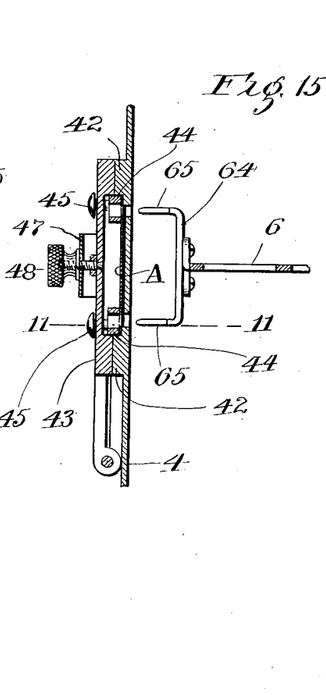
Fig. 15 is a similar section in the line 15 15 of Fig. 11.

Upon the back of the plate 4 are two guide-ribs 42, (see Figs. 9, 14, and 15,) between which the ribbon is passed after it comes from the sprocket 7. A gate 43 is hinged to the plate 4, and this gate is opened, as shown in Fig. 9, when the ribbon is being threaded through the machine and afterward closed to direct the course of the ribbon in its passage by the exposure-opening in the plate 4.

Figure 8:
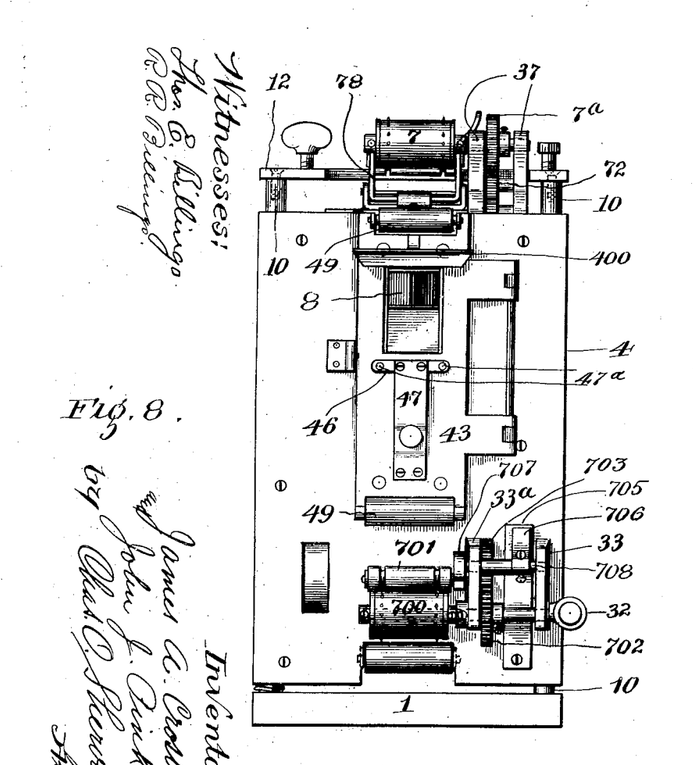
Fig. 8 is a rear view of the part seen in Fig. 6.

The gate 43 supports a pair of friction-shoes 44, which press upon the ribbon near its edges and apply friction thereto, so as to steady its movement through this portion of the machine and prevent any vibration or other movement thereof while in a position of rest and exposure. As shown, the pins 65 extend through slots in the plate 4 and engage the ribbon. The shoes 44 are also slotted to permit the ends of the pins to move freely therein. The shoes are mounted upon the gate 43 by means of pins 45 47$^a$, which pins are secured to the shoes and pass through perforations in the gate 43. (See Figs. 9 and 11.) A spring 47 is secured upon the outer face of the gate 43 and is screwed to a cross-bar 46, (see Figs. 8 and 11,) which cross-bar in turn is secured to the shoes 44 by the pins 47$^a$. The pins 47$^a$ are located approximately midway between the ends of the shoes, so that pressure upon them by the spring 47 will be distributed equally along their entire bearing-surface. The shoes are of considerable length and extend past the light-opening and beyond the ribbon-advancing mechanism, thus maintaining the ribbon in a perfectly flat condition as it passes the light-opening and the advancing mechanism. The tension of this spring is regulated by a thumb-nut 48, so that the desired amount of friction upon the ribbon can be had by adjusting the thumb-nut 48. Rollers 49 are journaled upon the ends of the gate 43, and the ribbon passes over these rollers in entering and leaving the guiding-channel between the gate 43 and plate 4. The gate is formed with an opening in line with the opening in the plate 4, and the light from the lamp passes through these openings and through the ribbon and to the screen. In front of the plate 4 is a diaphragm 4$^a$, which is supported upon the posts 10. The opening in this diaphragm is approximately the same size as the pictures upon the ribbon and is in line with the lens and directly in front of the opening in the plate 4. The picture is "framed" by raising or lowering the sliding frame 3 to bring the picture in front of the opening in the diaphragm.

Figure 10:
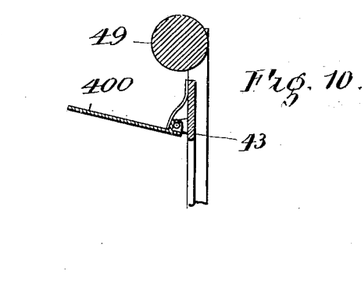
Fig. 10 is a sectional view illustrating a certain light-shield.

We have provided a light-screen 400, hinged to the door and held in an open or shut position by a spring. The light from the lamps which are used in connection with the devices of this class is very intense at this point, and it often happens that when the ribbon stops for some cause the light sets fire thereto. By swinging the shield down upon the opening any danger from fire is thus avoided.

Below the gate 43 is a second sprocket 700 and roller 701, between which the ribbon passes after it leaves the lower roller 49. The sprocket 700 is journaled in brackets 33 and 33$^a$, and its spindle bears a gear 702 in mesh with a gear 703, which meshes with the gear 52. The sprocket 700 is geared to rotate at the same speed as the sprocket 7. The roller 701 is journaled upon an arm 707, which bears a spindle 708, journaled in the lugs 33 33$^a$. The roller and spindle are eccentrically disposed with respect to each other, and the roller is held in contact with the ribbon by a spring 705, which presses upon an arm 706, fast upon the spindle 708. When threading the machine, the roller 701 is swung away from the sprocket and held back by the spring 705. This disposes of the ribbon-advancing mechanism, and we will next describe the mechanism for intermittently exposing the ribbon and shutting off the light.

In front of the diaphragm is a rotatable shutter 8, which is journaled upon the frame 3 of the machine. This shutter bears a miter-gear 81, which meshes with a miter-gear 82, (see Fig. 4,) fast upon the spindle 74$^a$ of the pinion 74 of the train running from the sprocket 72 to the main shaft 5. The shutter is cylindrical in form, the shell of which is cut away at certain places for the passage of the light, and the parts of the shell which remain form blades which cut off the passage of the light. The shutter is formed with two blades 83 and two blades 84, which extend between the two heads 85 of the shutter. The two blades 83 cut off the light to the screen when they pass the diaphragm-opening, and their passage by said opening is timed to take place simultaneously with the advancement of the ribbon. When the ribbon comes to a position of rest, the blades 83 have passed the opening and the light can again pass through. Much difficulty has been encountered in machines of this kind, because of the flickering of the picture upon the screen. We have found that by passing a very small blade in front of the ribbon while the picture is exposed this difficulty is practically avoided. The blades 83 are provided for this purpose. The lens is shown at B and is of the ordinary type used in connection with machines of this class.

Figure 20:
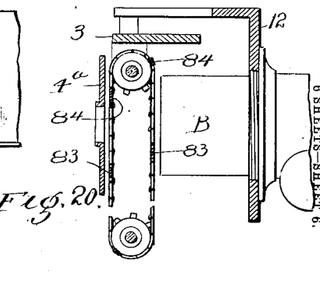
Fig. 20 is a sectional view illustrating a modified form of shutter.

In Fig. 20 we have shown a slightly-modified form of shutter. The blades are here mounted upon a chain and pass up and down before the ribbon. This form is sometimes useful when it is desired to use a short-focus lens, in which case the lens can be brought much nearer the ribbon.

Figure 17:
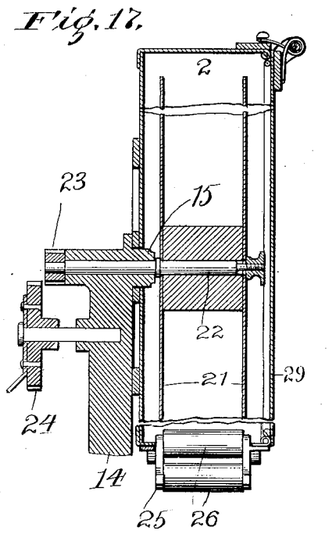
Fig. 17 is a section in the line 17 17 of Fig. 1.

The ribbon is wound upon a spool 21 in the magazine 2, and this spool is removably clamped upon a spindle 22. (See Fig. 17.) The spindle is journaled in the arm 14 and bears upon its outer end a pinion 23, which meshes with a pinion 24, which is provided with a crank for its rotation. This mechanism is used for rewinding the ribbon after it has been run through the machine. The magazine is formed with a central opening which fits over a boss 15 on the arm 14 and is secured to the arm by a thumb nut and screw 17. The arm bears a slotted plate 18, through which the screw projects, and the angular position of the magazine can be fixed by turning it to the proper position and then tightening the thumb-nut.

Figure 16:
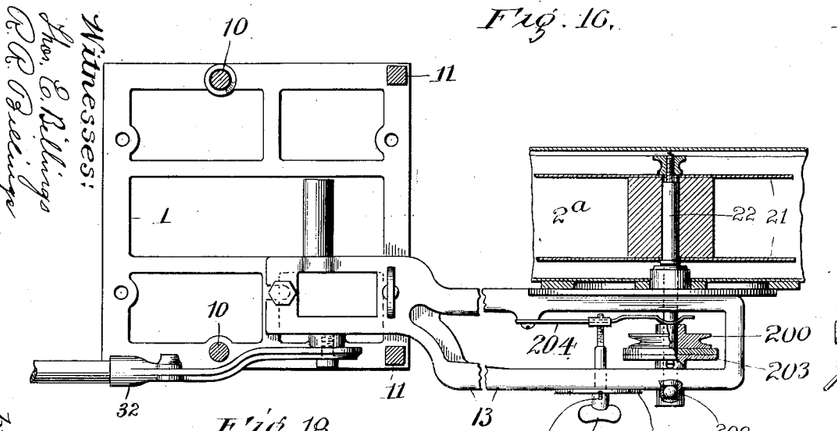
Fig. 16 is a view, partly in plan and partly in horizontal section, of the frame and lower magazine, the posts of the frame being cut away and the upper half of the magazine cut away in the line 16 16 of Fig. 1.
Figure 18:
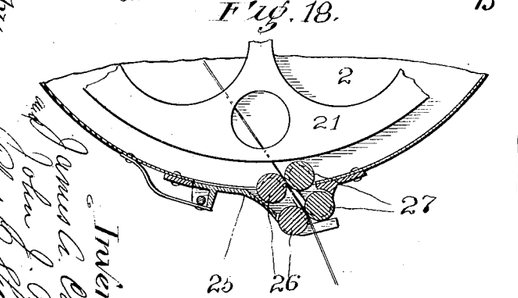
Fig. 18 is a fragmental view, of one of the magazine ribbon-guiding mechanism.
Figure 19:
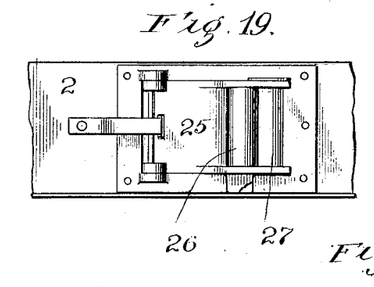
Fig. 19 is an under plan view of the same.

The magazine is provided with a gate 25, (see Figs. 3, 18, and 19,) which is spring-pressed in an open or closed position. The gate is adapted to close up the opening through which the ribbon passes out from the magazine. Said gate bears two rollers 26, and the magazine has two rollers 27 located adjacent to the rollers 26, and the ribbon in issuing from the magazine passes between the rollers 26 and 27. The wall of the magazine is cut away at 28 (see Fig. 3) to permit the ribbon to be passed sidewise into the magazine. This obviates the necessity of threading the ribbon out through the opening in the periphery of the magazine. The door of the magazine is shown at 29 and is hinged thereto in any suitable manner. When it is closed and the gate 25 is swung into place, the slot 28 is completely closed. The magazine $2^a$ and its spool are like the ones just described, except that the spindle bears a pulley 200, which is connected by a belt 201 to a driving-pulley 511, fast upon the crank-shaft 5. This belt is preferably in the form of a coiled spring, so as to allow of the vertical adjustment of the frame 3. It is desirable that the driving connection between the pulley 200 and the spool be in the form of some sort of friction appliance, so that the spool may not rotate any faster than is necessary to wind up the ribbon, regardless of the speed at which the rest of the mechanism is driven. It will be understood that as the ribbon becomes wound upon the spool the diameter of the roll becomes greater, and were the spool to rotate at the same uniform speed the ribbon would become torn off. To avoid this possibility, the pulley 200 is loose upon the spindle and is held in frictional contact with a disk 203, which is fast upon the shaft, by a spring 204. The tension of the spring is regulated by a thumb-screw 205, which is provided with a spring-pointer 206, which moves around with the thumb-screw as it is turned to vary the tension. The pointer passes in front of a dial 207, which is formed with radial notches into which the pointer snaps as it passes, so that the position of the pointer can be told in the dark as well as in the light. Starting with the empty spool and the tension adjusted properly, the operator can decrease the amount of tension as the spool fills up, and consequently decrease the speed thereof. The end thrust of the spindle is taken up by a ball-bearing 209, as shown in Fig. 16.

The operation of the machine in exhibiting pictures is as follows: The ribbon, which has previously been wound upon the upper spool, is threaded through the machine and onto the lower spool. The frame 3 is then adjusted to "frame" the picture, the light from the lamp projecting the picture upon the screen. The crank 51 is then rotated, and rotation of the cam-shafts 58 and $58^a$ and cams 59, $59^a$, and 500 is effected through the gearing. The ribbon-advancing plate 6 is consequently reciprocated and moved into and out of engagement with the ribbon by said cams, each downward movement of the plate advancing the ribbon one step, and the continued reciprocation of said plate brings the pictures in succession to a position in front of the diaphragm-opening. Simultaneously with the advancement of the ribbon the blades 83 of the shutter pass said opening and shut off the light. By the time the ribbon comes to a position of rest the blades have passed by the opening, and the light is again permitted to pass through, projecting the picture upon the screen. While the picture is thus exposed the narrow blades 84 pass through the rays of light, making the picture a trifle dimmer, but apparently reducing the flickering to a marked degree. The sprocket 7 is rotated by its train of gears and feeds the ribbon to the advancing mechanism, and the sprocket 700 is likewise rotated by its train of gears to carry the ribbon away as fast as it is fed forward. After passing the sprocket 700 it enters the lower magazine, when it is wound upon the spool. When the entire ribbon has passed through the machine, it may be rewound upon the upper spool without passing back through the machine. This is done by loosening the thumb-screws 17, turning the magazines until the gates are opposite each other, opening the gates, attaching the ribbon upon the upper spool, and turning the crank.

Particular attention is called to the fact that the ribbon-advancing plate is supported and guided entirely by the cams which operate the plate. This obviates the necessity of providing other guiding or supporting devices for the plate, thereby reducing the friction and number of parts to a minimum.

We realize that considerable variation is possible in the details of this construction without departing from the spirit of the invention, and we therefore do not intend to limit ourselves to the specific form herein shown and described.

We claim as new and desire to secure by Letters Patent—

1. In a device of the class described, the combination with mechanism for guiding and intermittently advancing the ribbon, of a cylindrical light-shutter coöperating therewith having two diametrically opposite openings in its shell arranged to be brought into register to expose the ribbon and having a narrow wall in one of said openings which passes the exposed ribbon.

2. In a device of the class described, the combination with mechanism for guiding and intermittently advancing the ribbon, of a cylindrical light-shutter coöperating therewith having two diametrically opposite openings in its shell arranged to be brought into register to expose the ribbon and having a plurality of narrow walls in said openings arranged to pass the exposed ribbon in opposite directions.

3. In a device of the class described, the combination with a suitably-operated shutter of ribbon-advancing mechanism comprising a frame having pins for engagement with the ribbon, a pair of parallel suitably-driven shafts, flanged cams upon said shafts constructed and arranged to support, guide and actuate the ribbon-advancing frame, said frame being unprovided with any other guiding or supporting means.

4. In a device of the class described, the combination with a suitably-operated shutter of ribbon-advancing mechanism comprising a frame having pins for engagement with the ribbon, a pair of parallel suitably-driven shafts, a pair of flanged cams upon said shafts arranged to reciprocate the frame transversely with respect to the ribbon and a cam upon one of the shafts arranged to reciprocate the frame longitudinally of the ribbon and upon the first-named cams, the frame being unprovided with any other supporting or guiding means.

5. In a device of the class described, the combination with mechanism for intermittently advancing the ribbon, of a guide therefor, a pair of suitably-supported friction-shoes engaging the edges thereof and guided to move transversely, a spring, and connections between the spring and the shoes, said connections engaging the shoes approximately midway between their ends.

6. In a device of the class described, the combination with mechanism for intermittently advancing the ribbon, of a guide therefor, a gate, a pair of friction-shoes guided upon the gate and movable transversely thereof, a spring, and connections between the spring and the shoes, said connections engaging the shoes approximately midway between their ends.

7. In a device of the class described, the combination with mechanism for intermittently advancing the ribbon, and a shutter coöperating therewith, of two rotatably-mounted magazines, ribbon-spools journaled therein, means connected with the ribbon-advancing mechanism for winding the ribbon upon one of the spools, gates in said magazines through which the ribbon passes to and from the magazine and means for operating the other spool to rewind the ribbon upon the spool from which it was unwound without passing it back through the machine.

8. In a device of the class described, the combination with a support, a boss on said support, and a magazine rotatably mounted upon said boss, of means for clamping the magazine in place, a spindle journaled in said support, a spool removably mounted upon the spindle and suitable means for rotating the spindle.

9. In a device of the class described, the combination with a ribbon-spool, of a magazine inclosing the same and having a slot across its periphery through which the ribbon can be passed, and a gate having means for closing up that portion of the slot beyond the edge of the ribbon.

10. In a device of the class described, the combination with a ribbon-spool, of a magazine inclosing the same and having a slot across its periphery through which the ribbon can be passed, and a spring-pressed gate having means for closing up that portion of the slot beyond the edge of the ribbon.

11. In a device of the class described, the combination with a ribbon-spool, of a magazine inclosing the same and having a slot across its periphery through which the ribbon can be passed, guide-rollers adjacent to the slot, a gate hinged to the magazine and adapted to partially close said slot and rollers journaled upon said gate, and adapted to coact with the first-mentioned rollers to guide the ribbon in its passage from the magazine.

12. In a device of the class described, the combination with mechanism for intermittently advancing the ribbon, and a shutter coöperating therewith, of a spool, connections between the ribbon-advancing mechanism and the spool for rotating the spool, a friction device interposed in said connecting device, and means for regulating the friction incorporating a handle located upon a stationary portion of the machine whereby the tension device may be operated while the spool is in motion.

13. In a device of the class described, the combination with mechanism for guiding and intermittently advancing the ribbon, and a shutter coöperating therewith, of a ribbon-spool, driving connections between the ribbon-advancing mechanism and spool, a friction device interposed in said driving mechanism, means for regulating said friction device, and a dial coöperating with said regulating device to indicate the degree of friction.

14. In a device of the class described, the combination with mechanism for guiding and intermittently advancing the ribbon, and a shutter coöperating therewith, of a ribbon-spool, driving connections between the ribbon-advancing mechanism and spool, and a friction device interposed in said connection device comprising substantially two friction members, one of which is rigidly connected to the spool, a stationary spring engaging with the other friction member, and means for regulating the tension of the spring.

15. In a device of the class described, the combination with mechanism for guiding and intermittently advancing the ribbon, and a shutter coöperating therewith, of a ribbon-spool, driving connections between the ribbon-advancing mechanism and spool, and a friction device interposed in said connection device comprising substantially two friction members, one of which is rigidly connected to the spool, a stationary spring engaging the other friction member, and a regulating-screw engaging said spring.

16. In a device of the class described, the combination with mechanism for guiding and intermittently advancing the ribbon, and a shutter coöperating therewith, of a ribbon-spool, driving connections between the ribbon-advancing mechanism and spool, and a friction device interposed in said connection device comprising substantially two friction members, one of which is rigidly connected to the spool, a spring engaging the other friction member, a regulating-screw engaging said spring, and an indicating-dial coöperating with said screw to indicate the degree of friction upon the friction members.

17. In a device of the class described, the combination with mechanism for guiding and intermittently advancing the ribbon, and a shutter coöperating therewith, of a ribbon-spool, driving connections between the ribbon-advancing mechanism and spool, and a friction device interposed in said connection device comprising substantially two friction members, one of which is rigidly connected to the spool, a spring engaging the other friction member, a regulating-screw engaging said spring and bearing a spring-pointer, and a dial having radial grooves coöperating with said pointer to indicate the degree of tension upon the friction members.

18. In a device of the class described, the combination with mechanism for guiding and intermittently advancing the ribbon, and a shutter coöperating therewith, of a ribbon-spool, a spindle carrying the same, a spool-supporting arm in which said spindle is journaled, driving connections between the advancing mechanism and the spindle, a regulatable friction device interposed in said connecting mechanism, and an antifriction-bearing adapted to take up the end thrust of said friction device.

19. In a device of the class described, the combination with feed-sprockets, a long ribbon-guideway having an opening therethrough, ribbon-advancing mechanism adjacent thereto incorporating engagement-pins, a pair of long friction-shoes adapted to bear upon the edges of the ribbon and extending beyond the opening and the engagement-pins, and a spring having means for engagement with said shoes approximately midway between their ends.

In witness whereof we have signed the above application for Letters Patent, at Chicago, in the county of Cook and State of Illinois, this 10th day of February, A. D. 1906.

JAMES A. CROSBY.
JOHN J. PINK.

Witnesses:
  CHAS. O. SHERVEY,
  S. SORENSON.